(12) United States Patent
Sjöland et al.

(10) Patent No.: US 9,793,943 B2
(45) Date of Patent: Oct. 17, 2017

(54) DUPLEXER-LESS TRANSCEIVER AND COMMUNICATION APPARATUS

(71) Applicant: Telefonaktiebolaget LM Ericsson (publ), Stockholm (SE)

(72) Inventors: Henrik Sjöland, Lund (SE); Stefan Andersson, Lund (SE); Tobias Tired, Lund (SE); Johan Wernehag, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/496,571

(22) Filed: Apr. 25, 2017

(65) Prior Publication Data

US 2017/0230076 A1   Aug. 10, 2017

Related U.S. Application Data

(63) Continuation of application No. 14/405,521, filed as application No. PCT/EP2013/061040 on May 29, 2013, now Pat. No. 9,667,404.

(Continued)

(30) Foreign Application Priority Data

Jun. 7, 2012   (EP) .................................. 12171223

(51) Int. Cl.
*G01R 31/08* (2006.01)
*H04B 7/00* (2006.01)
(Continued)

(52) U.S. Cl.
CPC ........... *H04B 1/582* (2013.01); *H04L 5/1461* (2013.01)

(58) Field of Classification Search
CPC .......... H04B 1/582; H04B 1/58; H04L 5/1461
See application file for complete search history.

(56) References Cited

U.S. PATENT DOCUMENTS

| 404,375 A | 6/1889 | Bain |
| 3,900,823 A * | 8/1975 | Sokal ..................... H03F 1/0216 |
| | | 330/129 |

(Continued)

FOREIGN PATENT DOCUMENTS

| EP | 0388927 A1 | 9/1990 |
| EP | 1813030 A1 | 8/2007 |

(Continued)

OTHER PUBLICATIONS

Elzayat, Ahmed M. et al., "Tx/Rx Isolation Enhancement Based on a Novel Balanced Duplexer Architecture", IEEE 2011, 2011, 1-4.

(Continued)

*Primary Examiner* — Faruk Hamza
*Assistant Examiner* — Abu-Sayeed Haque
(74) *Attorney, Agent, or Firm* — Murphy, Bilak & Homiller, PLLC

(57) ABSTRACT

A duplexer-less transceiver arrangement is disclosed. The transceiver comprises a receiver configured for frequency-division duplex communication with a communication network; a transmitter configured for frequency-division duplex communication with the communication network; an antenna port for connecting to an antenna; a balancing impedance circuit arranged to provide an adaptive impedance arranged to mimic the impedance at the antenna port; and an impedance network differentially connecting the receiver, transmitter, antenna port and balancing impedance circuit, wherein the impedance network includes a cross-connection.

13 Claims, 6 Drawing Sheets

Related U.S. Application Data

(60) Provisional application No. 61/659,539, filed on Jun. 14, 2012.

(51) Int. Cl.
*H04J 3/00* (2006.01)
*H04B 1/58* (2006.01)
*H04L 5/14* (2006.01)

(56) References Cited

U.S. PATENT DOCUMENTS

| | | | |
|---|---|---|---|
| 4,325,140 | A | 4/1982 | Stitzer |
| 5,404,375 | A | 4/1995 | Kroeger et al. |
| 6,169,912 | B1 | 1/2001 | Zuckerman |
| 6,567,648 | B1 | 5/2003 | Ahn et al. |
| 6,567,649 | B2 | 5/2003 | Souissi |
| 6,745,018 | B1 | 6/2004 | Zehavi et al. |
| 7,109,793 | B2 | 9/2006 | Nakatani et al. |
| 7,756,480 | B2 | 7/2010 | Loh |
| 8,654,743 | B1 * | 2/2014 | Li ............. H01Q 1/3216 370/278 |
| 2003/0008693 | A1 | 1/2003 | Tanaka et al. |
| 2004/0180633 | A1 | 9/2004 | Nakatani et al. |
| 2005/0035824 | A1 | 2/2005 | Kearns et al. |
| 2005/0046585 | A1 | 3/2005 | Dodge |
| 2005/0170790 | A1 * | 8/2005 | Chang ............ H04B 1/005 455/90.3 |
| 2006/0028298 | A1 | 2/2006 | Nakamura et al. |
| 2006/0133599 | A1 | 6/2006 | Pagnanelli |
| 2006/0261902 | A1 | 11/2006 | Masuda et al. |
| 2007/0015468 | A1 | 1/2007 | Kouki et al. |
| 2007/0117524 | A1 | 5/2007 | Do |
| 2007/0152904 | A1 | 7/2007 | Castaneda et al. |
| 2007/0202826 | A1 * | 8/2007 | Dean ............ H04B 7/15535 455/230 |
| 2007/0207747 | A1 | 9/2007 | Johnson et al. |
| 2007/0217488 | A1 | 9/2007 | Smaini et al. |
| 2008/0198773 | A1 | 8/2008 | Loh |
| 2008/0238789 | A1 * | 10/2008 | Wilcox ............ H04B 1/0458 343/750 |
| 2008/0242235 | A1 * | 10/2008 | Adler ............. H04B 1/006 455/73 |
| 2009/0028074 | A1 | 1/2009 | Knox |
| 2009/0253385 | A1 | 10/2009 | Dent et al. |
| 2009/0289739 | A1 * | 11/2009 | Sasaki ............ H04B 1/0057 333/132 |
| 2010/0035563 | A1 | 2/2010 | Mikhemar et al. |
| 2010/0109800 | A1 | 5/2010 | Ueda et al. |
| 2010/0148886 | A1 | 6/2010 | Inoue et al. |
| 2010/0253477 | A1 | 10/2010 | Seppä et al. |
| 2010/0279617 | A1 * | 11/2010 | Osman ............ H04B 17/104 455/63.1 |
| 2010/0304701 | A1 | 12/2010 | Jung et al. |
| 2011/0064004 | A1 | 3/2011 | Mikhemar et al. |
| 2011/0064005 | A1 | 3/2011 | Mikhemar et al. |
| 2011/0124309 | A1 | 5/2011 | Trotta et al. |
| 2011/0158134 | A1 | 6/2011 | Mikhemar et al. |
| 2011/0175789 | A1 * | 7/2011 | Lee ............. H01Q 1/243 343/853 |
| 2011/0187478 | A1 | 8/2011 | Link et al. |
| 2011/0199142 | A1 | 8/2011 | Mu et al. |
| 2011/0221521 | A1 | 9/2011 | Razzell et al. |
| 2011/0299433 | A1 | 12/2011 | Darabi et al. |
| 2012/0009886 | A1 | 1/2012 | Poulin |
| 2012/0126907 | A1 | 5/2012 | Nakamoto et al. |
| 2012/0195351 | A1 * | 8/2012 | Banwell ............ H04B 1/525 375/219 |
| 2013/0176912 | A1 | 7/2013 | Khlat |
| 2013/0271004 | A1 | 10/2013 | Min et al. |
| 2014/0169231 | A1 | 6/2014 | Mikhemar et al. |
| 2014/0253236 | A1 | 9/2014 | Cheeranthodi et al. |
| 2016/0065352 | A1 | 3/2016 | Sjoland et al. |

FOREIGN PATENT DOCUMENTS

| | | |
|---|---|---|
| EP | 2226948 A1 | 9/2010 |
| EP | 2388927 A2 | 11/2011 |
| EP | 2296286 A3 | 3/2013 |
| EP | 2672631 A1 | 12/2013 |
| RU | 2264032 C2 | 11/2005 |
| WO | 2007149954 A1 | 12/2007 |
| WO | 2009080878 A1 | 7/2009 |
| WO | 2011146404 A1 | 11/2011 |

OTHER PUBLICATIONS

Larson, L. et al., "4th Generation Wireless Transceiver Design", 2010 IEEE, 2010, 113-120.

Mikhemar, M. et al., "A Tunable Integrated Duplexer with 50dB Isolation in 40nm CMOS", 2009 IEEE International Solid-State Circuits Conference Session 22 / PA and Antenna Interface / 22.7, Feb. 11, 2009, 4 pages.

Mikhemar, Mohyee et al., "An On-Chip Wideband and Low-Loss Duplexer for 3G/4G CMOS Radios", IEEE 2010 Symposium on VLSI Circuits/Technical Digest of Technical Papers, 2010, 129-130.

Pursula, Pekka et al., "Hybrid Transformer-Based Adaptive RF Front End for UHF RFID Mobile Phone Readers", 2008 IEEE International Conference on RFID The Venetian, Las Vegas, Nevada 1C1.4, 2008, 150-155.

* cited by examiner

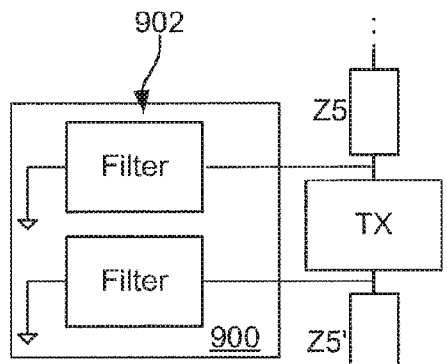
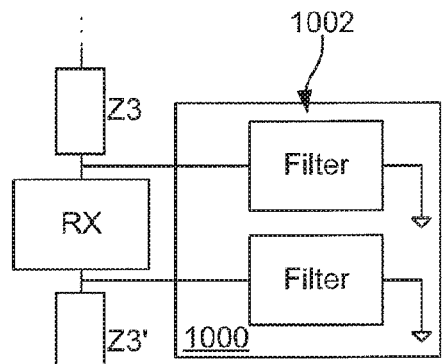
Fig. 9
Fig. 10
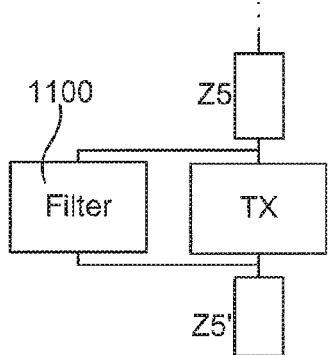
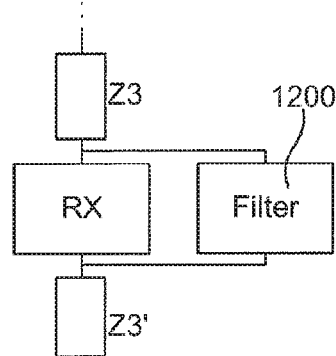
Fig. 11
Fig. 12
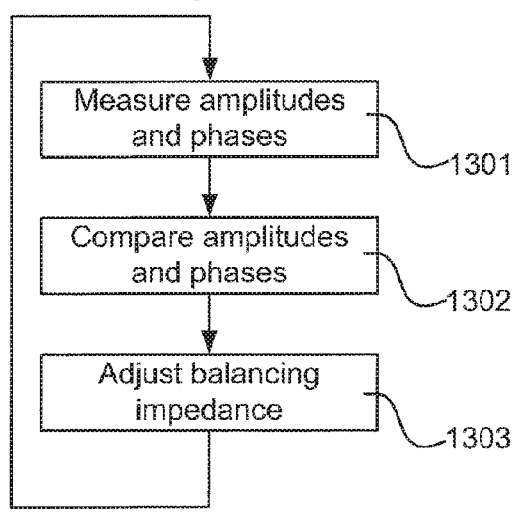
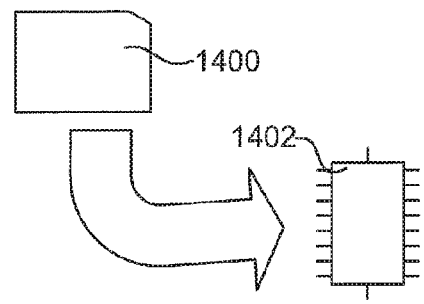
Fig. 13
Fig. 14

DUPLEXER-LESS TRANSCEIVER AND COMMUNICATION APPARATUS

RELATED APPLICATIONS

This application is a continuation of co-pending U.S. patent application Ser. No. 14/405,521, filed 4 Dec. 2014, which is a national stage entry under 35 U.S.C. §371 of international patent application serial no. PCT/EP2013/061040, filed 29 May 2013, which claims benefit of provisional application 61/659,539 filed 14 Jun. 2012 and foreign application EP12171223.6 filed 7 Jun. 2012. The entire contents of each of the aforementioned applications are incorporated herein by reference.

TECHNICAL FIELD

The present invention generally relates to a duplexer-less transceiver. The present invention also relates to a communication device capable of frequency division duplex communication comprising such a transceiver.

BACKGROUND

Transceivers comprise both a transmitter and a receiver, and are commonly used in a variety of communication apparatuses. Transceivers can be arranged to be operated in semi-duplex, i.e. the receiver and transmitter operates separated in time to prevent the transmitter signal from concealing the received signal. This approach is therefore commonly referred to as time division duplex (TDD). Transceivers can also be operated in full duplex, i.e. the receiver and transmitter operates simultaneously wherein some special arrangements are provided to prevent the transmitter from concealing the received signal. One approach to achieve this is to assign different frequencies for transmission and reception. This approach is therefore commonly referred to as frequency division duplex (FDD).

Often the receiver and the transmitter use the same antenna, or antenna system which may comprise several antennas, which implies that some kind of circuitry may be desired to enable proper interaction with the antenna. This circuitry should be made with certain care when operating the transceiver in full duplex since the transmitter signal, although using FDD, may interfere with the received signal, i.e. internal interference within the transceiver. FIG. 1 illustrates an example of a communication apparatus 100 comprising a transceiver 102, an antenna 104 connected to the transceiver 102, and further circuitry 106 such as processing means, input and output circuitry, and memory means. The transceiver 102 comprises a transmitter 108, a receiver 110, and a duplexer 112 which is connected to the transmitter 102, the receiver 110 and the antenna 104. The duplexer 112 is arranged to direct radio frequency (RF) signal from the transmitter to the antenna, as indicated by arrow 114, and from the antenna to the receiver, as indicated by arrow 116, and can for example comprise a circulator. Duplexers are known in the art and for example described in U.S. Pat. No. 4,325,140. However, duplexers are not ideal and a leakage of transmitter signals from the transmitter to the receiver, as indicated by arrow 118, is at least to some degree present. Further, duplexers are commonly costly, space consuming and challenging to be implemented on-chip. Therefore, efforts have been made in the art to achieve the similar effects with on-chip solutions. These are based on electrical balance by using a dummy load which is arranged to be equal to the antenna impedance. FIG. 2 illustrates an example of such a structure 200, which is also disclosed in WO 2009/080878 A1, comprising a transmitter 202, a receiver 204, and an antenna 206. The transmitter 202 provides its output signal both to a branch towards the antenna 206, the branch comprising a capacitor 208 and an inductor 210, and to a branch towards a dummy load 212, the branch comprising a capacitor 208' and an inductor 210'. The dummy load 212 is arranged to mimic the impedance of the antenna 206, and by the achieved symmetry, and, when using a differential input to the receiver 204 via a transformer 214, the contribution at the receiver input from the transmitted signal can be suppressed.

SUMMARY

An object of the invention is to at least alleviate the above stated problem. The present invention is based on the understanding that counteracting contribution from a transmitter at a receiver input in a transceiver reduces or cancels signal leakage that otherwise would require a duplexer solution or the like. The inventors have found that contribution by the transmitter signal at the receiver input via one branch can be counteracted by the contribution by the transmitter signal at the receiver input via another branch including a cross connection, wherein the aggregate contribution by the transmitter signal at the receiver input is ideally zero.

According to a first aspect, there is provided a duplexer-less transceiver arrangement comprising a receiver arranged for frequency-division duplex communication with a communication network, a transmitter arranged for frequency-division duplex communication with the communication network, an antenna port for connecting to an antenna, a balancing impedance circuit) arranged to provide an adaptive impedance arranged to mimic the impedance at the antenna port, and an impedance network differentially connecting the receiver, transmitter, antenna port and balancing impedance circuit.

The impedance network includes a cross-connection and may comprise impedances and connections such that the antenna port is differentially connected to the receiver via a first pair of impedances, a second pair of impedances and a third pair of impedances, wherein one of each of the first pair of impedances, the second pair of impedances and the third pair of impedances are connected in series, and another of the first pair of impedances, the second pair of impedances and the third pair of impedances are connected in series, the antenna port is differentially connected to the transmitter via the first pair of impedances, a fourth pair of impedances and a fifth pair of impedances, wherein one of each of the first pair of impedances, the fourth pair of impedances and the fifth pair of impedances are connected in series, and another of the first pair of impedances, the fourth pair of impedances and the fifth pair of impedances are connected in series, the balancing impedance circuit is differentially connected to the receiver via a sixth pair of impedances, a seventh pair of impedances and the third pair of impedances, wherein one of each of the sixth pair of impedances and the seventh pair of impedances and the another of the third pair of impedances are connected in series, and another of the sixth pair of impedances and the seventh pair of impedances and the one of the third pair of impedances are connected in series, the balancing impedance circuit is differentially connected to the transmitter via the sixth pair of impedances, an eighth pair of impedances and the fifth differential pair of impedances, wherein one of each of the sixth pair of impedances, the eighth pair of impedances and the fifth pair of impedances are connected in series, and another of the sixth differential pair of impedances, the eighth pair of impedances and the fifth pair of impedances are connected in series, and the pairs of impedances are symmetrically arranged and symmetrically valued with respect to the differential connections such that transmitter signal contribution through the third differential pair of impedances and the receiver is reduced.

The transceiver may further comprise a filter arrangement connected to differential outputs of the transmitter and/or at differential inputs of the receiver arranged to suppress transmitter output signal at frequency of reception.

The filter arrangement may comprise a pair of filters where respective filter of the pair is connected between respective output of the differential output of the transmitter or input of the differential input of the receiver and a signal ground.

Respective filters of the pair may be a frequency translated filter connected to the respective output of the differential output of the transmitter or input of the differential input of the receiver via a mixer clocked by any of the receiver frequency or the transmitter frequency.

The frequency translated filter may be a low-pass filter, wherein the filter is arranged at the transmitter output, and the mixer is clocked by the transmitter frequency.

The frequency translated filter may be a low-pass filter, wherein the filter is arranged at the receiver input, and the mixer is clocked by the receiver frequency.

The filter arrangement may comprise a filter connected between differential outputs of the transmitter and/or between differential inputs of the receiver.

The transceiver arrangement may further comprise a balun connected at the antenna port and arranged to convert the differential terminals of the antenna port to a single-ended port to an antenna.

The balun may comprise a transformer, and at least a part of the first pair of impedances is formed by a winding of the transformer.

The impedances of the first, third, fifth and sixth pairs of impedances may be inductances and the impedances of the second, fourth, seventh and eighth pairs of impedances may be capacitances.

The impedances of the first, third, fifth and sixth pairs of impedances may be capacitances and the impedances of the second, fourth, seventh and eighth pairs of impedances may be inductances.

The transceiver arrangement may further comprise amplitude and phase detectors at respective differential antenna port terminals and differential port terminals of the balancing impedance circuit, wherein the balancing impedance circuit comprises a controller arranged to control the adaptive impedance such that magnitude and phase are equal for the balancing impedance circuit to the antenna port.

All of the impedances of the first, third, fifth and sixth pairs of impedances may be implemented on-chip.

All of the impedances of the second, fourth, seventh and eighth pairs of impedances may be implemented on-chip.

According to a second aspect, there is provided a communication device, capable of frequency division duplex communication via a communication network, comprising a transceiver arrangement according to the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

FIG. 9 schematically illustrates a filter arrangement according to an embodiment.

FIG. 10 schematically illustrates a filter arrangement according to an embodiment.

FIG. 11 schematically illustrates a filter arrangement according to an embodiment.

FIG. 12 schematically illustrates a filter arrangement according to an embodiment.

FIG. 13 is a flow chart which schematically illustrates a method according to embodiments.

FIG. 14 schematically illustrates a computer program and a processor.

DETAILED DESCRIPTION

Figure 1:
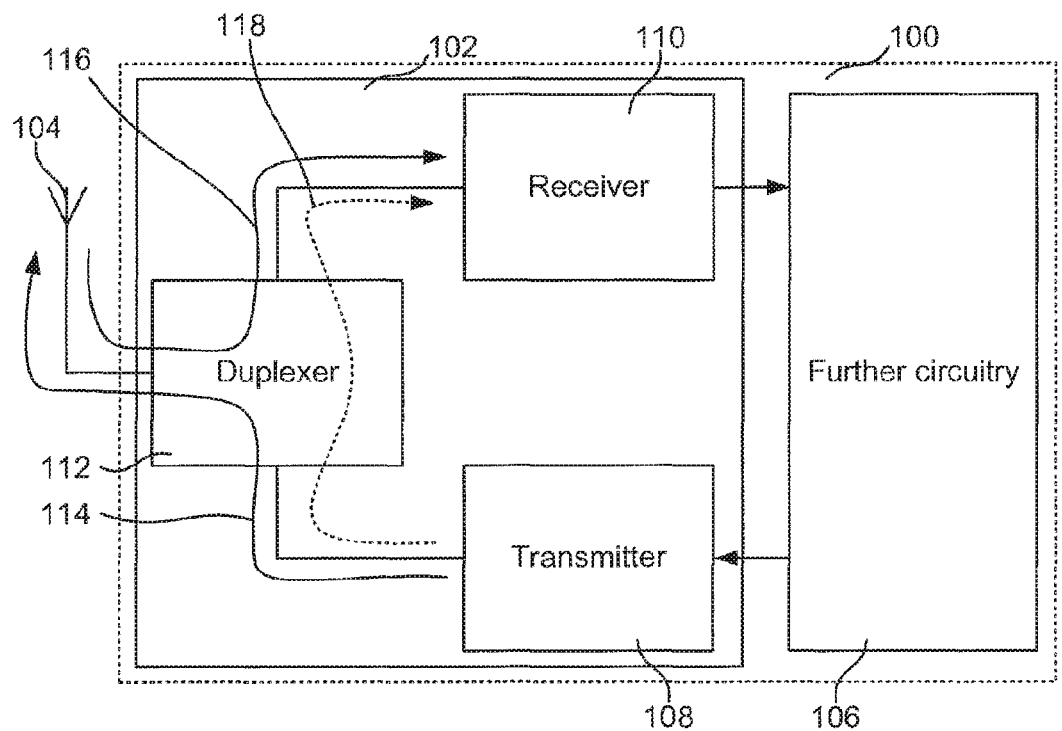
FIG. 1 is a block diagram which schematically illustrates a conventional communication apparatus comprising a transceiver.
Figure 2:
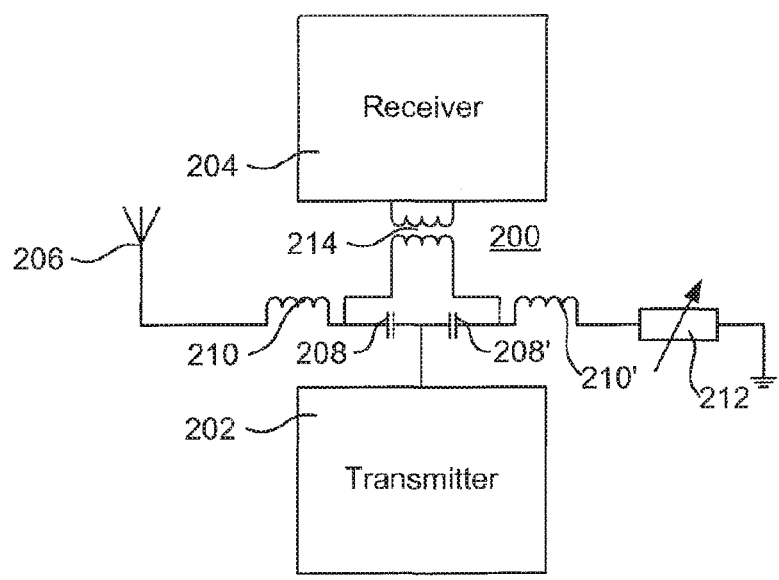
FIG. 2 is a schematic circuit diagram which illustrates a FDD transceiver arrangement without duplexer and based on electrical balance.
Figure 3:
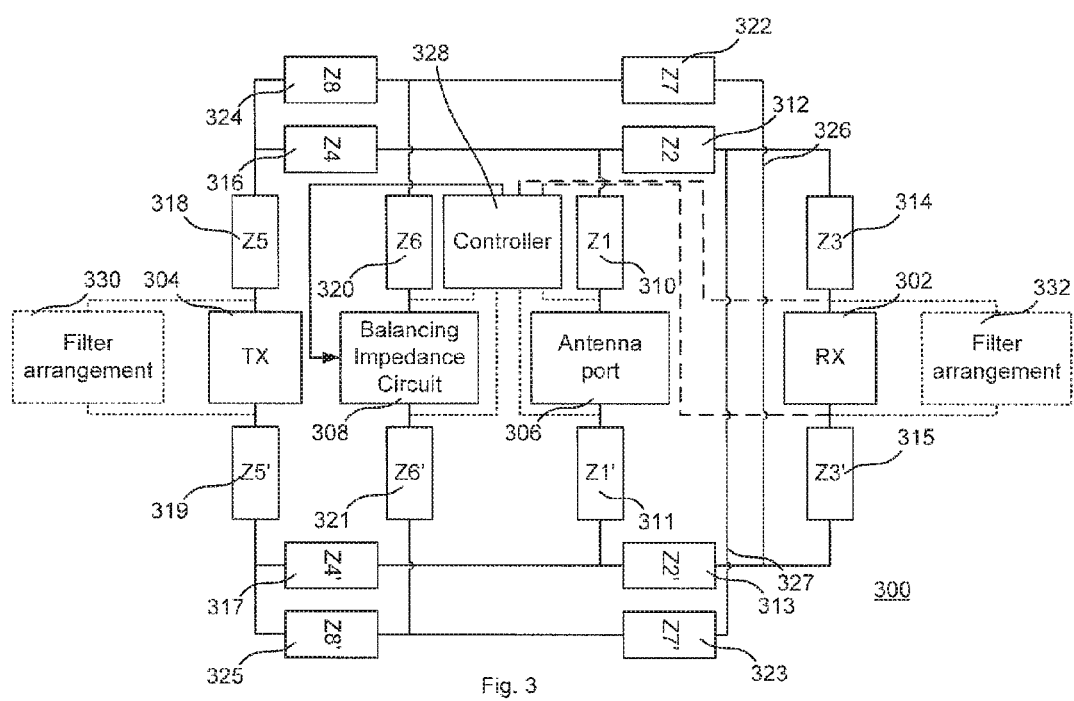
FIG. 3 is a block diagram which schematically illustrates a transceiver according to an embodiment.

FIG. 3 is a block diagram which schematically illustrates a transceiver arrangement 300 according to an embodiment. The transceiver comprises a receiver 302 configured for frequency-division duplex communication with a wireless or wired communication network, a transmitter 304 configured for frequency-division duplex communication with the wireless or wired communication network, an antenna port 306 for connecting to an antenna, and a balancing impedance circuit 308 arranged to provide an adaptive impedance arranged to mimic the impedance at the antenna port 306.

The transceiver arrangement 300 works differentially and has a symmetry between the antenna port 306 and the balancing impedance circuit 308, wherein a portion of the circuitry connected to the balancing impedance circuit 308 to the receiver 302 is cross-connected with respect to the portion of the circuitry connected to the antenna port 306. This provides for cancelling of transmitter signal contribution at receiver input when balancing impedance circuit 308 is perfectly mimicking the impedance at the antenna port 306. Considering that an absolutely perfect mimic of impedance may not be present at all times, the transmitter signal contribution at receiver input is at least significantly reduced. This is accomplished by a circuitry comprising pairs of impedances that are symmetrically arranged and symmetrically valued with respect to the differential connections.

The antenna port 306 is differentially connected to the receiver 302 via a first pair of impedances 310, 311, a second pair of impedances 312, 313 and a third pair of impedances 314, 315. It should be noted that the notation in the drawings of the impedances as Zx and Zx', where x is an integer, is for the purpose of illustrating the differential mirrored circuit, and Zx' should not be interpreted as a complex conjugate of Zx. One of each 310, 312, 314 of the first pair of impedances, the second pair of impedances and the third pair of impedances are connected in series, and another 311, 313, 315 of the first pair of impedances, the second pair of impedances and the third pair of impedances are connected in series between the respective differential terminals of the antenna port 306 and the receiver 302.

The antenna port 306 is also differentially connected to the transmitter 304 via the first pair of impedances 310, 311, a fourth pair of impedances 316, 317 and a fifth pair of impedances 318, 319. One of each 310, 316, 318 of the first pair of impedances, the fourth pair of impedances and the fifth pair of impedances are connected in series, and another 311, 317, 319 of the first pair of impedances, the fourth pair of impedances and the fifth pair of impedances are connected in series between the respective differential terminals of the antenna port 306 and the transmitter 304.

The balancing impedance circuit 308 is differentially connected to the receiver 302 via a sixth pair of impedances 320, 321, a seventh pair of impedances 322, 323 and the third pair of impedances 314, 315. One of each 320, 322 of the sixth pair of impedances and the seventh pair of impedances and the another 315 of the third pair of impedances are connected in series, and another 321, 323 of the sixth pair of impedances and the seventh pair of impedances and the one 314 of the third pair of impedances are connected in series between the respective differential terminals of the balancing impedance circuit 308 and the receiver 302.

The balancing impedance circuit 308 is differentially connected to the transmitter 304 via the sixth pair of impedances 320, 321, an eighth pair of impedances 324, 325 and the fifth differential pair of impedances 318, 319. One of each 320, 324, 318 of the sixth pair of impedances, the eighth pair of impedances and the fifth pair of impedances are connected in series, and another 321, 325, 319 of the sixth differential pair of impedances, the eighth pair of impedances and the fifth pair of impedances are connected in series between the balancing impedance circuit 308 and the transmitter 304.

Thereby, the contribution by the transmitter signal at the receiver input via the fifth pair of impedances 318, 319, the fourth pair of impedances 316, 317, the second pair of impedances 312, 313 and the third pair of impedances 314, 315 is counteracted by the contribution by the transmitter signal at the receiver input via the fifth pair of impedances 318, 319, the eighth pair of impedances 324, 325, the seventh pair of impedances 322, 323, the cross connections 326, 327 and the third pair of impedances 315, 314, wherein the aggregate contribution by the transmitter signal at the receiver input is ideally zero.

Symmetry is desired to keep the aggregate contribution by the transmitter signal at the receiver input close to zero, i.e. through the branch of the sixth pair of impedances 320, 321 and the balancing impedance circuit 308 and the branch of the first pair of impedances 310, 311 and the antenna port 306. This is accomplished by adapting the impedance of the balancing impedance circuit 308 to mimic the impedance of at the antenna port 306. This can be made by having a controller 328 controlling an adaptive impedance of the balancing impedance circuit 308. Here, although the controller 328 is depicted as a separate element, it can be integrated with the balancing impedance circuit 308.

The controller 328 can comprise circuitry measuring transmitter contribution signal at the input of the receiver 302, as indicated by hashed lines, and provide control to the balancing impedance circuit 308 using a control scheme where the transmitter signal contribution at the receiver input is minimised at all times.

Alternatively, the controller 328 can comprise amplitude and phase detectors at respective differential antenna port 306 and differential port of the balancing impedance circuit 308, as indicated by dotted lines. Magnitude and phase of the signals can thus be kept equal for the balancing impedance circuit 308 and the antenna port 306, wherein the symmetry is achieved. A particular advantage of the latter alternative is a fairly simple and fast adjustment approach where real, i.e. corresponding to magnitude, and imaginary, i.e. corresponding to phase, components of the adaptive impedance of the balancing impedance circuit 308 are directly controlled based on derived differences in magnitude and phase, which are controlled to be zero which facilitates accuracy, between the antenna port 306 and the balancing impedance circuit 308.

In case increased isolation between transmitter 304 and receiver 302 is needed, or for facilitating control of the balancing impedance circuit 308, a filter arrangement 330, 332 can be arranged to limit transmitter signal at receiver input. The filter arrangement 330, 332 can be arranged at transmitter output and/or at receiver input. For example, since frequency-division duplex is applied, transmit and receive frequencies are separated, wherein the transmit frequency can be 100-200 MHz lower than the receive frequency for an allocated up-link and down-link channel set. A high-pass filter across the transmitter output or a low-pass filter across the receiver input with cut-off frequency assigned between the transmit and receive frequencies can then limit transmitter signal at receiver input. Other suitable filter arrangements will be further elucidated with reference to FIGS. 7 to 12 below.

Figure 4:
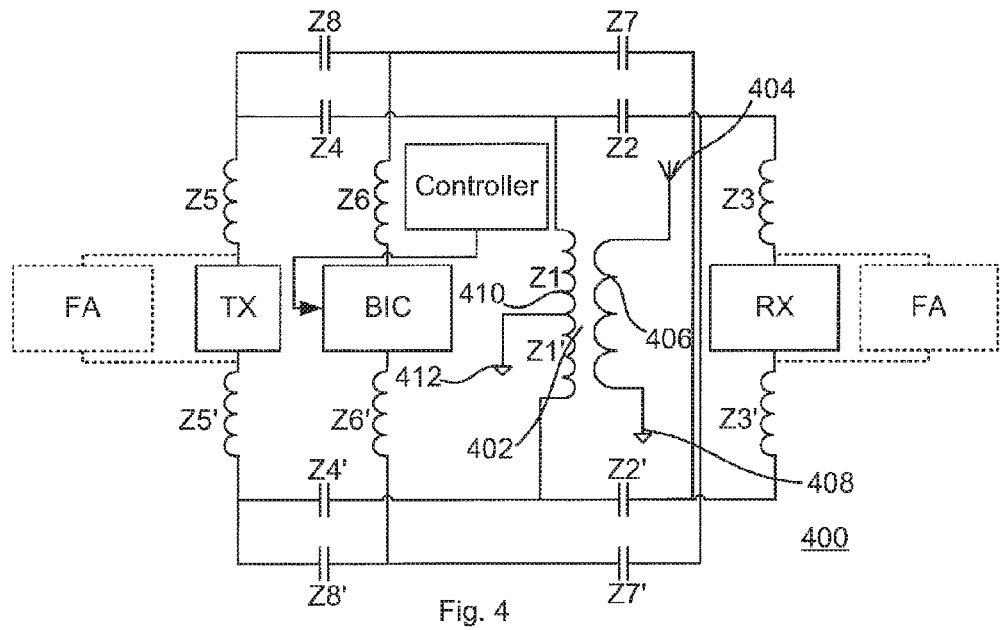
FIG. 4 is a block diagram which schematically illustrates a transceiver according to an embodiment.

FIG. 4 is a block diagram which schematically illustrates a transceiver arrangement 400 according to an embodiment. The transceiver arrangement 400 corresponds to that demonstrated with reference to FIG. 3, and for reasons of conciseness, only the particular features of the transceiver arrangement 400 compared to the transceiver arrangement 300 of FIG. 3 will be demonstrated. In other senses, the features of transceiver arrangement 400 can be as any of the other features of the transceiver arrangement 300 of FIG. 3.

The transceiver arrangement 400 comprises eight pairs of impedances as demonstrated above, wherein the first, third, fifth and sixth pairs of impedances comprises inductors, while the second, fourth, seventh and eighth pairs of impedances comprises capacitors. Furthermore, a balun 402 is arranged to fit a single-ended input from an antenna 404 to the differential antenna port. The balun 402 can comprise a transformer with a primary winding 406 connected between the antenna 404 and a signal ground 408. A secondary winding 410 comprises a first portion and a second portion wherein a point where the first portion and the second portion mutually connects is also connected to a signal ground 412. The first pair of impedances can be formed by the first portion and the second portion, respectively, of the secondary winding. Here, the inductances of at least the sixth pair of impedances should therefore be designed accordingly to achieve the symmetry between the antenna port branch and the balancing impedance circuit branch.

Figure 5:
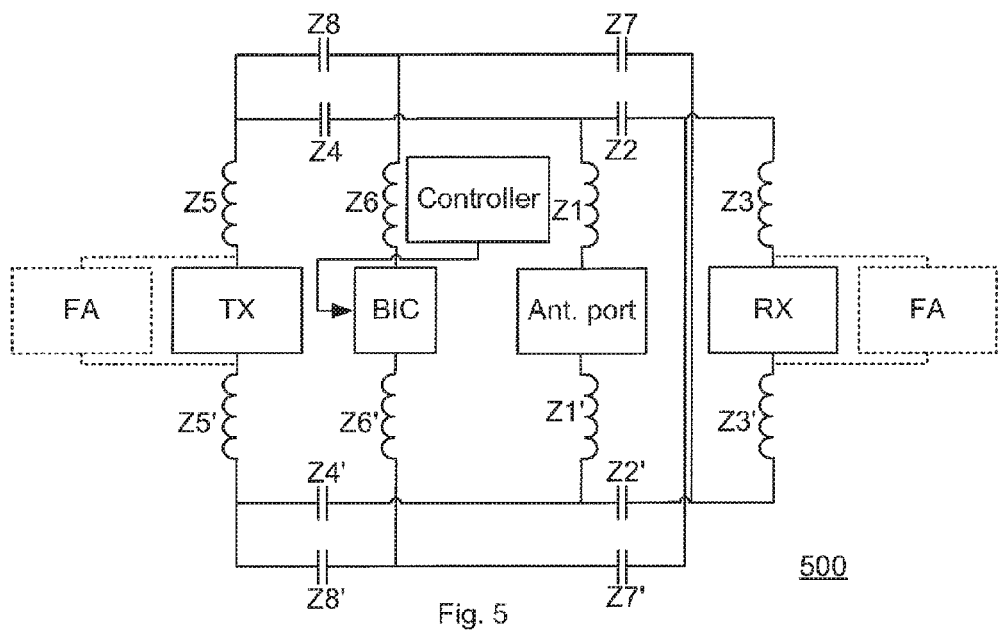
FIG. 5 is a block diagram which schematically illustrates a transceiver according to an embodiment.

FIG. 5 is a block diagram which schematically illustrates a transceiver arrangement 500 according to an embodiment. The transceiver arrangement 500 corresponds to that demonstrated with reference to FIG. 3, and for reasons of conciseness, only the particular features of the transceiver arrangement 500 compared to the transceiver arrangement 300 of FIG. 3 will be demonstrated. In other senses, the features of transceiver arrangement 500 can be as any of the other features of the transceiver arrangement 300 of FIG. 3. The transceiver arrangement 500 comprises eight pairs of impedances as demonstrated above, wherein the first, third, fifth and sixth pairs of impedances comprises inductors, while the second, fourth, seventh and eighth pairs of impedances comprises capacitors.

Figure 6:
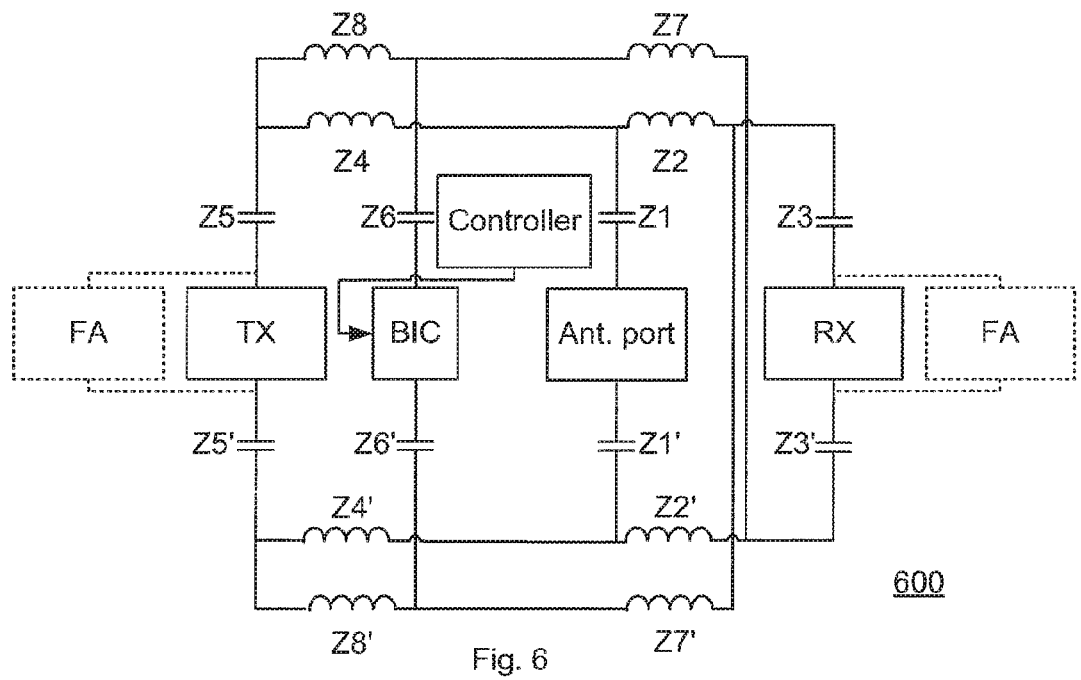
FIG. 6 is a block diagram which schematically illustrates a transceiver according to an embodiment.

FIG. 6 is a block diagram which schematically illustrates a transceiver arrangement 600 according to an embodiment. The transceiver arrangement 600 corresponds to that demonstrated with reference to FIG. 3, and for reasons of conciseness, only the particular features of the transceiver arrangement 600 compared to the transceiver arrangement 300 of FIG. 3 will be demonstrated. In other senses, the features of transceiver arrangement 600 can be as any of the other features of the transceiver arrangement 300 of FIG. 3. The transceiver arrangement 600 comprises eight pairs of impedances as demonstrated above, wherein the first, third, fifth and sixth pairs of impedances comprises capacitors, while the second, fourth, seventh and eighth pairs of impedances comprises inductors.

Figure 7:
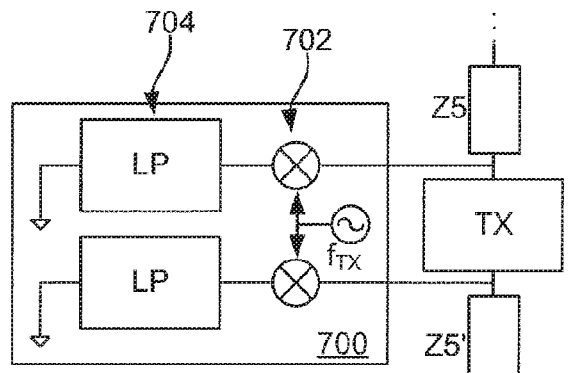
FIG. 7 schematically illustrates a filter arrangement according to an embodiment.

FIG. 7 schematically illustrates a filter arrangement 700 according to an embodiment. The filter arrangement 700 is connected to transmitter output, and employs frequency translated filtering. The filter can comprise passive quadrature mixers 702 clocked at transmit frequency and low-pass impedances 704 connected to a signal ground. The impedance of the filter arrangement at transmit frequency then becomes very high, while at receive frequency, the impedance becomes very low. Thereby, output signals at receive frequency from the transmitter are connected to signal ground and will not propagate to receiver input. Output signals at transmit frequency will on the other hand not be grounded, and will propagate to the antenna port.

Figure 8:
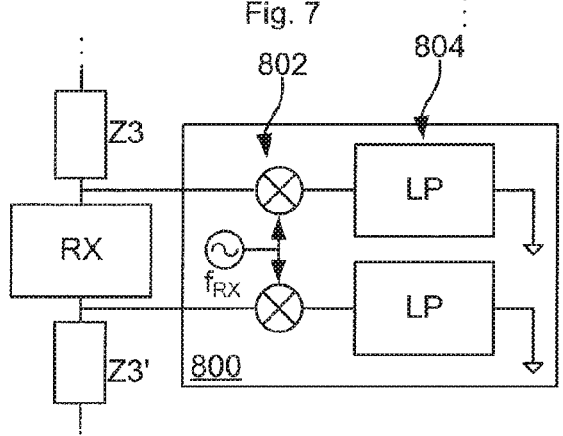
FIG. 8 schematically illustrates a filter arrangement according to an embodiment.

FIG. 8 schematically illustrates a filter arrangement 800 according to an embodiment. The filter arrangement 800 is connected to receiver input, and employs frequency translated filtering. The filter can comprise passive quadrature mixers 802 clocked at receive frequency and low-pass impedances 804 connected to a signal ground. The impedance of the filter arrangement at transmit frequency then becomes very low, while at receive frequency, the impedance becomes very high. Thereby, output signals at receive frequency from the transmitter propagating towards the receiver input are connected to signal ground and will not reach the receiver input. Input signals at receive frequency will on the other hand not be grounded, and will be received at receiver input.

FIG. 9 schematically illustrates a filter arrangement 900 according to an embodiment. The filter arrangement 900 is connected to transmitter output, and employs traditional filtering. The filter arrangement 900 can comprise filters 902 connected to the respective differential output of the transmitter. When receive frequency is lower than transmit frequency, the filters 902 can employ low-pass impedances connected to a signal ground with a cut-off frequency between the transmit frequency and the receive frequency. When receive frequency is higher than transmit frequency, the filters 902 can employ high-pass impedances connected to a signal ground with a cut-off frequency between the transmit frequency and the receive frequency. A band-pass filter passing receive frequency but stopping the transmit frequency, or a band-stop filter stopping the transmit frequency but passing receive frequency can also be employed. The impedance of the filter arrangement at transmit frequency then becomes very high, while at receive frequency, the impedance becomes very low. Thereby, output signals at receive frequency from the transmitter are connected to signal ground and will not propagate to receiver input. Output signals at transmit frequency will on the other hand not be grounded, and will propagate to the antenna port.

FIG. 10 schematically illustrates a filter arrangement 1000 according to an embodiment. The filter arrangement 1000 is connected to receiver input, and employs traditional filtering. The filter arrangement 1000 can comprise filters 1002 connected to the respective differential input of the receiver. When receive frequency is lower than transmit frequency, the filters 1002 can employ high-pass impedances connected to a signal ground with a cut-off frequency between the transmit frequency and the receive frequency. When receive frequency is higher than transmit frequency, the filters 902 can employ low-pass impedances connected to a signal ground with a cut-off frequency between the transmit frequency and the receive frequency. A band-pass filter passing transmit frequency but stopping the receive frequency, or a band-stop filter stopping the receive frequency but passing transmit frequency can also be employed. The impedance of the filter arrangement at transmit frequency then becomes very low, while at receive frequency, the impedance becomes very high. Thereby, output signals at receive frequency from the transmitter propagating towards the receiver input are connected to signal ground and will not reach the receiver input. Input signals at receive frequency will on the other hand not be grounded, and will be received at receiver input.

FIG. 11 schematically illustrates a filter arrangement according to an embodiment comprising a filter 1100 connected between terminals of the differential output of the transmitter. With techniques similar to those demonstrated with reference to FIGS. 7 and 9, frequencies at receive frequency emitted by the transmitter are prevented from propagating towards the receiver.

FIG. 12 schematically illustrates a filter arrangement according to an embodiment comprising a filter 1200 connected between terminals of the differential input of the receiver. With techniques similar to those demonstrated with reference to FIGS. 8 and 10, frequencies at receive frequency emitted by the transmitter are bypassed from propagating into the receiver.

Transceivers often operate at transmit and receive frequencies that are allocated from time to time, and the filters demonstrated with reference to FIGS. 7 to 12 are therefore preferably controllable, e.g. in sense of cut-off frequency, etc. Here, the filters employing frequency translated filters are particularly suitable since they are conveniently clocked by corresponding receive and/or transmit frequencies and thereby provides advantageous controllability properties.

The transceiver arrangements demonstrated above are particularly suitable for on-chip implementation, particularly since capacitors implemented on the same chip can be provided with excellent matching properties, which enhance the provision of a symmetric circuitry. The inductors demonstrated above can be implemented on-chip or off-chip. Here, it is noted that the series inductors demonstrated above are advantageous both in sense of impedance matching and in sense of reduction of insertion loss.

The particular advantage of the receiver input being in connection with two equal paths, except in sense of their mutual cross-coupling, where the two paths cancel the transmitter signal contribution at receiver input, is further advantageous since it works over a wide bandwidth. The effect is provided by the transmitter signal contribution from the two paths is the same irrespective of frequency since symmetry is provided. Thus, the effect of the invention will be present at all frequencies where the circuitry works in other senses.

It is important that the balancing impedance circuit really mimics the impedance of the antenna port. Here, the embodiment of phase and amplitude tracking demonstrated above shows a particular advantage due to its simplicity and speed.

FIG. 13 is a flow chart which schematically illustrates a method according to embodiments for controlling the balancing impedance circuit. The method includes measuring 1301 amplitudes at antenna port and balancing impedance circuit and phase also at antenna port and balancing impedance circuit. Amplitudes at antenna port and balancing impedance circuit, and phases at antenna port and balancing impedance circuit are mutually compared 1302. Since the balancing impedance circuit should mimic the antenna port, an adaptive impedance of the balancing impedance circuit is adjusted 1303 such that differences in amplitude and phase becomes zero. The control according to the method is operating continuously since impedance at antenna port can change over time, e.g. due to antenna environment. Continuously should in this context not be interpreted as an opposite to time-discrete since the control mechanism can be both a clocked process or a time-continuous process, but should be construed as the adaptation of the impedance of the balancing impedance circuit is updated over time to follow any impedance change at the antenna port.

FIG. 14 schematically illustrates a computer program and a processor. The method according to the present invention is suitable for implementation with aid of processing means, such as computers and/or processors, especially for the case where the controller of the balancing impedance circuit is implemented as processor or programmable circuit. Therefore, there is provided computer programs, comprising instructions arranged to cause the processing means, processor, or computer to perform the steps of any of the methods according to any of the embodiments described with reference to FIG. 13. The computer programs preferably comprises program code which is stored on a computer readable medium 1400, as illustrated in FIG. 14, which can be loaded and executed by a processing means, processor, or computer 1102 to cause it to perform the methods, respectively, according to embodiments of the present invention, preferably as any of the embodiments described with reference to FIG. 13. The computer 1402 and computer program product 1400 can be arranged to execute the program code sequentially where actions of the any of the methods are performed stepwise. The processing means, processor, or computer 1402 is preferably what normally is referred to as an embedded system. Thus, the depicted computer readable medium 1400 and computer 1402 in FIG. 14 should be construed to be for illustrative purposes only to provide understanding of the principle, and not to be construed as any direct illustration of the elements.

Figure 15:
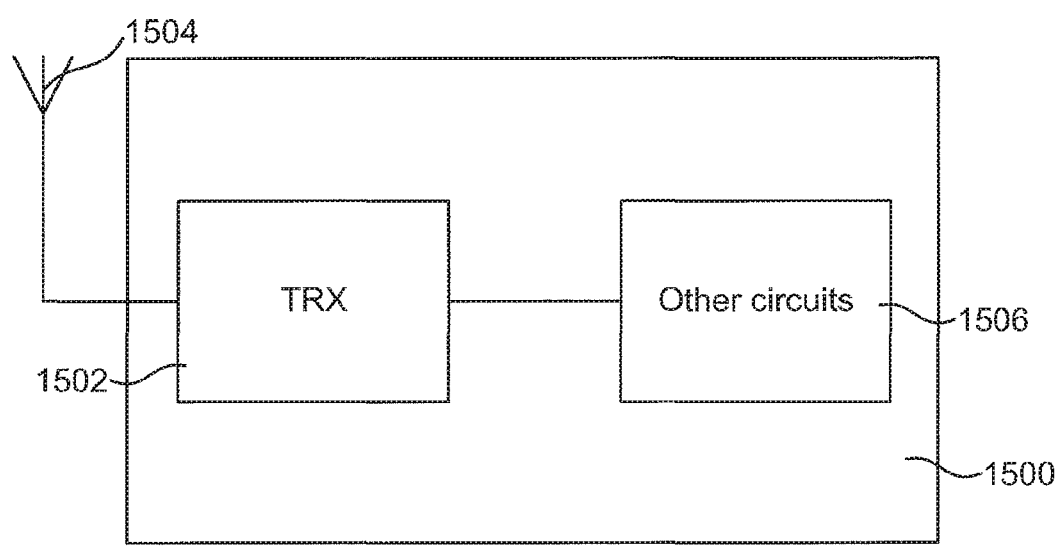
FIG. 15 is a block diagram schematically illustrating a communication device.

FIG. 15 is a block diagram schematically illustrating a communication device 1500. The communication device 1500 is capable of frequency division duplex communication via a communication network. The communication device 1500 comprises a transceiver arrangement 1502 according to any of the above demonstrated. The transceiver arrangement 1502 is connected to an antenna 1504 through its antenna port. The communication device can also comprise other circuits 1506, such as interface towards a user and/or other circuitry or machines, memory, processor, etc. The communication device 1500 can be a cellphone, a communication card or device in or for a computer, an embedded communication device in a machine, or the like. The communication device 1500 can be adapted for cellular communication, point-to-point communication, or for communication in a wireless or wired network.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A transceiver arrangement, comprising:
   a differential receiver configured for frequency-division duplex communication with a communication network, the receiver having a first input and a second input;
   a differential transmitter configured for frequency-division duplex communication with the communication network, the transmitter having a first output and a second output;
   a differential antenna port for connecting the transmitter and the receiver to an antenna, the antenna port having a first node and a second node;
   a balancing impedance circuit arranged to provide an adaptive impedance, the balancing impedance circuit having a first node and a second node;
   an impedance network, arranged to:
     connect the first output of the transmitter and the first input of the receiver to the first node of the antenna port;
     connect the second output of the transmitter and the second input of the receiver to the second node of the antenna port;
     connect the first output of the transmitter and the second input of the receiver to the first node of the balancing impedance circuit;
     connect the second output of the transmitter and the first input of the receiver to the second node of the balancing impedance circuit.

2. The transceiver arrangement of claim 1, wherein the antenna port is differentially connected to the receiver via a first pair of impedances a second pair of impedances, and a third pair of impedances.

3. The transceiver arrangement of claim 2, wherein the antenna port is differentially connected to the transmitter via the first pair of impedances, a fourth pair of impedances, and a fifth pair of impedances.

4. The transceiver arrangement of claim 3, wherein the balancing impedance circuit is differentially connected to the receiver via a sixth pair of impedances, a seventh pair of impedances, and the third pair of impedances.

5. The transceiver arrangement of claim 3, wherein the balancing impedance circuit is differentially connected to the transmitter via the sixth pair of impedances, an eighth pair of impedances, and the fifth differential pair of impedances.

6. The transceiver arrangement of claim 5, wherein all of the impedances of the first, third, fifth and sixth pairs of impedances are implemented on-chip.

7. The transceiver arrangement of claim 5, wherein all of the impedances of the second, fourth, seventh and eighth pairs of impedances are implemented on-chip.

8. The transceiver arrangement of claim 5, wherein the impedances of the first, third, fifth and sixth pairs of impedances are inductances and the impedances of the second, fourth, seventh and eighth pairs of impedances are capacitances.

9. The transceiver arrangement of claim 5, wherein the impedances of the first, third, fifth and sixth pairs of impedances are capacitances and the impedances of the second, fourth, seventh and eighth pairs of impedances are inductances.

10. The transceiver arrangement of claim 1, comprising a controller configured to control the adaptive impedance of the balancing impedance circuit.

11. The transceiver arrangement of claim 10, wherein to controller is configured to control the adaptive impedance of the impedance balancing circuit to mimic the impedance at the antenna port.

12. A communication device comprising the transceiver arrangement of claim 1.

13. The communication device of claim 12, wherein the communication device is a cellphone.

* * * * *

UNITED STATES PATENT AND TRADEMARK OFFICE
CERTIFICATE OF CORRECTION

PATENT NO. : 9,793,943 B2  
APPLICATION NO. : 15/496571  
DATED : October 17, 2017  
INVENTOR(S) : Sjöland et al.

Page 1 of 1

It is certified that error appears in the above-identified patent and that said Letters Patent is hereby corrected as shown below:

In the Specification

In Column 1, Line 7, delete "2014," and insert -- 2014, now Pat. No. 9,667,404, --, therefor.

In Column 2, Line 34, delete "circuit)" and insert -- circuit --, therefor.

In Column 8, Line 33, delete "filters 902" and insert -- filters 1002 --, therefor.

In Column 9, Line 61, delete "computer 1102" and insert -- computer 1402 --, therefor.

Signed and Sealed this
Thirteenth Day of February, 2018

Andrei Iancu
*Director of the United States Patent and Trademark Office*